W. R. Middleton.
Bolt.
Nº 108,926. Patented Nov. 1, 1870.

Inventor:
W. R. Middleton
pr Burridge & Co. Atty.

United States Patent Office.

WILLIAM R. MIDDLETON, OF CLEVELAND, OHIO.

Letters Patent No. 108,926, dated November 1, 1870.

IMPROVEMENT IN MACHINES FOR SEPARATING MIDDLINGS.

The Schedule referred to in these Letters Patent and making part of the same.

*To all whom it may concern:*

Be it known that I, WILLIAM R. MIDDLETON, of Cleveland, in the county of Cuyahoga and State of Ohio, have invented certain new and useful Improvements in Machines for Separating Middlings, of which the following is a full and complete description, reference being had to the accompanying drawing making a part of this specification, in which—

Like letters of reference refer to like parts in the several views.

The nature of this invention relates to an apparatus for the separation of middlings, the object being to obtain the fine particles of meal or flour therefrom, for the purpose of regrinding or not, as the quality of the separated flour may determine, as hereinafter more fully described.

Figure 1:
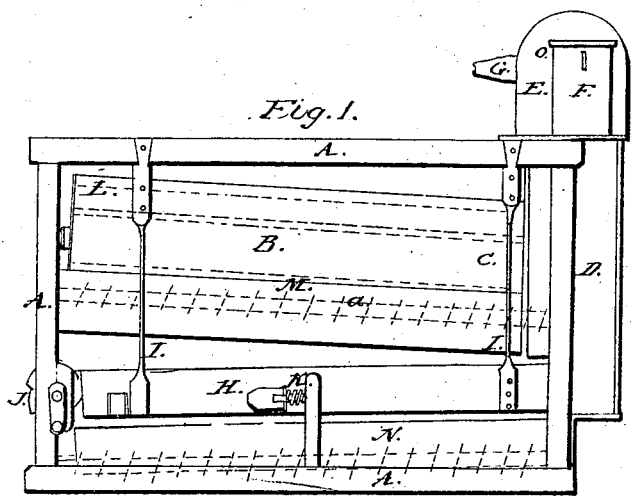
Figure 1 is a side view of the machine.

In the drawing, fig. 1, A represents a frame, in which the bolting-reel B is mounted. The tail end thereof is projected into the chamber D.

Immediately above said chamber is a blower or fan, E, put in communication with the chamber by means of an air-passage, F.

G, fig. 1, is the outlet or mouth of the blower. The purpose of said blower will hereinafter be shown.

H is a sieve suspended from the frame by means of the springs I, fig. 1, one of which is attached to each corner of the sieve.

A longitudinal vibratory action is obtained to the sieve by the wheel J, each tooth of which operates upon the end of the sieve, impelling it forward, but which is immediately returned by the springs K, situated one on each side of the sieve.

Figure 2:
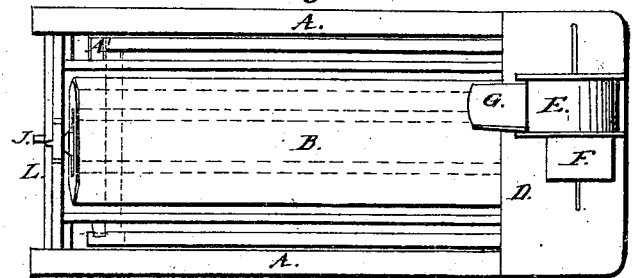
Figure 2 is a top view.
Figure 3:
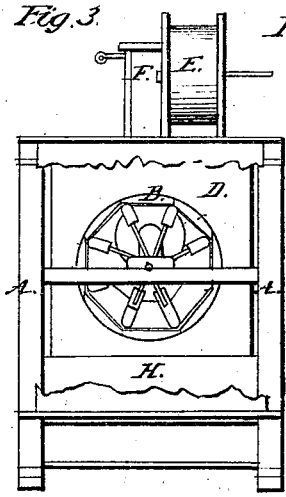
Figures 3 and 4 are end views.
Figure 4:
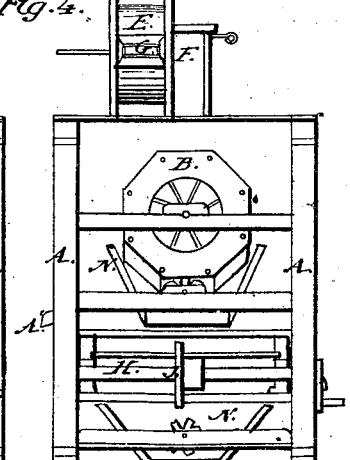

The practical operation of this machine is as follows:

The middlings to be bolted and sifted are conducted into the reel at the upper end or head L as the reel revolves. The fine particles of meal or flour fall through the cloth into the box M, immediately below it, and from which it is conducted by a conveyer, indicated by the dotted lines a, fig. 1, to the outside, through the spout A', fig. 2, (an end view of said conveyer is shown in fig. 4,) whereas the coarser stuff falls from the tail of the reel into the sieve H, the fine particles of which are shaken through it and fall into the box N, arranged underneath, while the coarse stuff or bran is discharged from the tail of the sieve into a bin or other place.

By this machine all the meal or flour is separated from the middlings, leaving nothing but the coarse, dark bran.

It will be obvious that two grades of flour are obtained from the middlings by this machine, the first or finest being that obtained from the reel, the second that obtained from the sieve. The first is a white, fine quality of flour, free from specks, and fit for use without regrinding. The second grade of flour, or that obtained from the sieve, is of a coarser quality, but free from bran; hence, on being re-ground, produces a fine grade of pure white flour.

By the use of the blower referred to all the dust and light particles of bran that may be floating about the reel and sieve are carried off, as the fan produces a current of air outward from the machine. Therefore no speckling of the flour can take place in consequence of the dark particles of bran falling into it.

*Claim.*

What I claim as my invention, and desire to secure by Letters Patent, is—

The combination of the reel B, sieve H, chamber D, and blower E, when arranged in relation to each other in the manner as and for the purpose set forth

WILLIAM R. MIDDLETON.

Witnesses:
W. H. BURRIDGE,
H. BURRIDGE.